(12) United States Patent
Bakke

(10) Patent No.: US 9,736,247 B2
(45) Date of Patent: *Aug. 15, 2017

(54) SYSTEM AND METHOD FOR ACCESS TO CONTINOUSLY RUNNING APPLICATION PROGRAMS BY NETWORK CONNECTED END-USER DEVICES

(71) Applicant: Netzyn Inc., Dallas, TX (US)

(72) Inventor: Steve Bakke, Richardson, TX (US)

(73) Assignee: Netzyn, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 14/940,502

(22) Filed: Nov. 13, 2015

(65) Prior Publication Data

US 2016/0072921 A1    Mar. 10, 2016

Related U.S. Application Data

(63) Continuation of application No. 13/692,237, filed on Dec. 3, 2012, now Pat. No. 9,219,661.

(Continued)

(51) Int. Cl.
*H04L 29/08*     (2006.01)
*H04L 12/26*     (2006.01)
(Continued)

(52) U.S. Cl.
CPC ........ *H04L 67/148* (2013.01); *H04L 41/5041* (2013.01); *H04L 43/00* (2013.01); *H04L 67/10* (2013.01); *H04L 67/142* (2013.01); *H04L 67/28* (2013.01); *H04L 67/40* (2013.01); *H04W 4/003* (2013.01); *H04W 4/18* (2013.01)

(58) Field of Classification Search
CPC ..... H04L 41/5041; H04L 67/10; H04L 67/40; H04L 43/00; H04L 67/142; H04L 67/28; H04L 67/148; H04W 4/003; H04W 4/18
See application file for complete search history.

(56) References Cited

U.S. PATENT DOCUMENTS

2007/0136488 A1* 6/2007 Cho ................. H04N 7/163
                                                   709/231
2011/0179146 A1* 7/2011 Park ................. H04L 12/2809
                                                   709/219

(Continued)

*Primary Examiner* — Michael C Lai
(74) *Attorney, Agent, or Firm* — The Law Firm of H. Dale Langley, Jr. P.C.

(57) ABSTRACT

A system for providing access to one or more application device, such as a respective processed application program, is connected to a telecommunications network including at least one user device. The system includes a manager device connected to the respective application device, and the manager device communicatively connects to the respective user device. Each application device includes a respective processing state and a state table of each respective processing state. The manager device updates the respective processing state of the state table for each application device and respective user device. Each user device accesses the manager device to obtain the respective processing state in the state table of the particular application device for the particular user device. User devices can switch communications with the manager device and application device, providing continuing operations of the application device with same processing state.

19 Claims, 9 Drawing Sheets

Related U.S. Application Data

(60) Provisional application No. 61/566,282, filed on Dec. 2, 2011.

(51) Int. Cl.
*H04W 4/00* (2009.01)
*H04W 4/18* (2009.01)
*H04L 12/24* (2006.01)
*H04L 29/06* (2006.01)

(56) References Cited

U.S. PATENT DOCUMENTS

2011/0295974 A1* 12/2011 Kashef ............... H04L 65/1073
709/217
2011/0320626 A1* 12/2011 Wong ............... H04N 21/41407
709/231

* cited by examiner

SYSTEM AND METHOD FOR ACCESS TO CONTINOUSLY RUNNING APPLICATION PROGRAMS BY NETWORK CONNECTED END-USER DEVICES

CROSS-REFERENCE TO RELATED APPLICATIONS

The present application is a continuation and has benefit of priority of U.S. patent application Ser. No. 13/692,237, titled "System and Method for Access to Continuously Running Application Programs by Network Connected End-User Devices", filed Dec. 3, 2012, issued on Dec. 22, 2015 as U.S. Pat. No. 9,219,661 (which is a conversion and has benefit of priority of U.S. Provisional Patent Application Ser. No. 61/566,282, titled "System and Method for Access to Continuously Running Applications by Various End-User Devices," filed Dec. 2, 2011), which prior application is and has at least one same inventor of the present application and is herein incorporated by this reference.

TECHNICAL FIELD

The invention generally relates to remote processing of application programs by a server computer accessible over a distributed network by end-user devices, and more particularly relates to systems and methods for serving remotely processed software and hardware application programs to end-user devices over a communications network and switching among end-user devices for access to the programs with continuous processing state.

BACKGROUND

End-user computing software programs and their operations (i.e., applications) have traditionally been processed (i.e., run) on an end-user device itself, for example, a personal computer (PC) running an application of the PC, a smartphone running an application on the smartphone, a game console running a game application on the console, and others. Recently end-user applications have been run on data center-located servers. These server-run applications are delivered to the end-user device via communicative connection of the end-user device to the servers.

Examples of this type of computing include Remote Desktop, where the complete PC Operating System and the user's PC applications are run on a server and then delivered as a single application to an end-user device such as a low-end PC or thin-client computing device communicatively connected to the server.

Another example of an application run by a data-center located server is a web server running a hypertext markup language (HTML) version of the application, where the end-user device communicatively connects to the web server over a communications network via a browser to access that application.

Certain platform architectures for servers and communications systems, for example, the Hierarchical Display-Server System described in U.S. patent application Ser. No. 13/160,122, create a system of multiple applications capable of being delivered to completely non-intelligent end-user devices (and/or other end-user devices).

It would be a significant improvement in the art and technology to provide applications run by a remote server computer for access by end-user devices, which end-user devices can be switched while maintaining continuous processing state for the running applications.

SUMMARY

An embodiment of the invention is a system communicatively connected to a telecommunications network. At least one user device is communicatively connected to the network. The system includes a manager device communicatively connected to the network for communicating with the at least one user device, at least one application device, the at least one application device communicatively connected to the manager device and communicatively connected to the network for communicating with the at least one user device, each respective one of the at least one application device includes a respective processing state, and a state table of each respective processing state, the state table is communicatively connected to the manager device, the manager device updates the respective processing state of the state table for each respective one of the application device for each respective one of the at least one user device. Each of the at least one user device communicatively connects over the network to the manager device, to access any respective one of the application device and obtain the respective processing state of the application device for the user device, as then-maintained in the state table by the manager device.

A manager application device is used to control the movement of applications from one device to another. The manager application is aware of all of a user device's running applications and all of a user's devices. The manager application is the traffic cop and responds to application movement requests from the user devices. The manager application also provides security for all application and user devices.

Two types of application movement can provided: push and pull. To pull an application to a new user device, the user goes to the new user device and requests from the manager the list of applications. After the list is delivered to the user device, the user selects the desired application and the manager directs that application to the new user device. The new user device now is accessing the application.

To push an application to a new user device, the user of the application informs the manager that that application should be moved to a new user device. The manager directs that application to the new user device. The user then moves to the new user device and that device is accessing the application.

Another embodiment of the invention is a system communicatively connected to a packet switched network. A first communications device and a second communications device each communicatively connected to the network. The system includes a manager communicatively connected to the network for communicating with the first communications device and the second communications device, an application device communicatively connected to the manager and communicatively connected to the network for communicating with the first communications device and the second communications device, the application device includes a processing state of operations of the application device during communicative operations of the application device with the each of the first communications device and the second communications device over the network, and a table of the processing state, the table is communicatively connected to the manager, the manager updates the processing state of the table during operations of the application device via communications over the network with the first communications device and the second communications device.

The application device continuously runs and no state information is lost. The application device begins on the second device at same place that it ended on the first device. However because devices may have different characteristics, such as display size and input methods, the application device may reformat the information for the second device or respond to different types of user input on the second device.

In other embodiments, running the application device on a data center server may not be possible. A distributed application device architecture can be used, where application instances are run on each individual user device. The application instance of each user device can communicate with other application instances on other user devices. When an application instance is activated, it gets the current state from the last running application instance. Alternatively, each running application instance can constantly send the application state to a central location and other instances upon activation will get the application state from the central location.

Yet another embodiment of the invention is a method of remotely providing access to a processed application program to at least one user device. The method includes first serving the processed application program over a telecommunications network to a first user device communicatively connected to the network, collecting a process state of the processed application program during operation, storing the process state of the processed application, switching serving the processed application program over the telecommunications network to a second user device communicatively connected to the network, second serving the processed application program over the telecommunications network to the second user device, and retrieving the process state by the second user device upon the step of switching.

BRIEF DESCRIPTION OF THE DRAWINGS

The present invention is illustrated by way of example and not limitation in the accompanying figures, in which like references indicate similar elements, and in which.

DETAILED DESCRIPTION

In this disclosure, "application" is used to refer to a computer software program stored in memory and/or electronic circuitry, controlled by a microprocessor to perform an operation or sequence of operations on data, for example, an application program processed by a computer; "run" or "running" is used to refer to the processing of such an application by a microprocessor, for example, of a computing device; and "session" is used to refer to a period of communicative connectivity of an end-user device to a computer running an application, for example, connectivity of a client device communicatively connected over a network to one or more server computer processing an application served to the client device.

Figure 1:
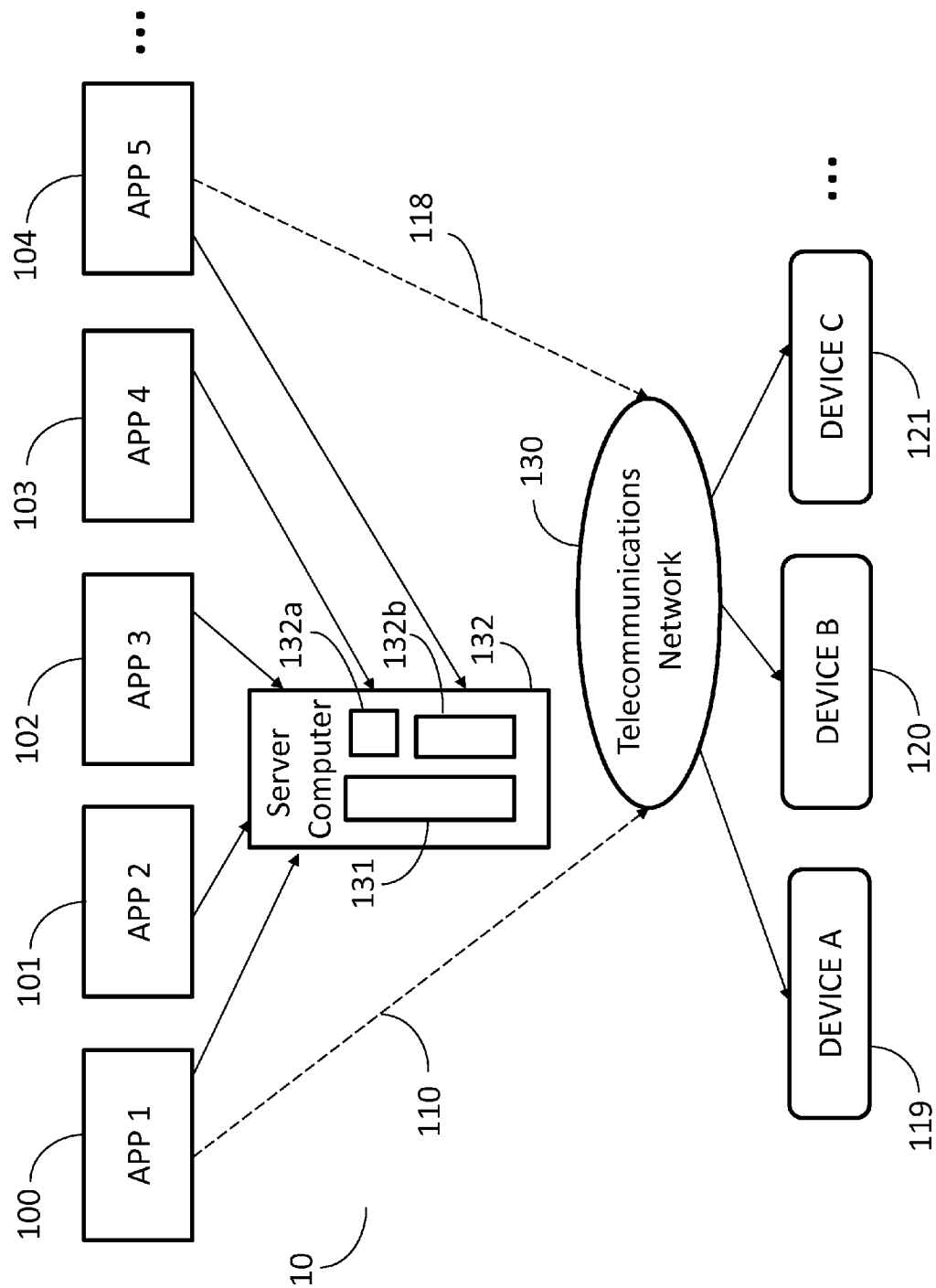
FIG. 1 illustrates a system of a manager device and a plurality of processed application devices connected to a network, in communication with user devices, according to certain embodiments of the invention.

Referring to FIG. 1, a system 10 for providing access to continuously running application programs includes a manager application 131 and at least one application (e.g., App1 100, App2 101, App3 102, App4 103, and App5 104) of or communicatively connected to the the manager application 131. The manager application 131 includes, or is communicatively connected to, a processor 132a and memory 132b, such as one or more server computer 132. The manager application 131 is communicatively connected to one or more telecommunications network 130. A non-exclusive example of the network 130 is a packet-switched data network, such as a local area network (LAN), wide area network (WAN), Internet, intranet, virtual private network (VPN), other communications link or combination of links and nodes, or combinations of these. Links of the network 130 can include any wired, wireless, optical, satellite, infrared, cellular, other channel, or combinations of these.

Each application, for example purposes, App1 100, App2 101, App3 102, App4 103, and App5 104, is included in the manager application 131, and/or communicatively connected to the manager application 131 by the network 130 or other link or circuit, for example, a direct link (as shown in FIG. 1 for purposes of example but not limitation). Although not shown in detail in FIG. 1, each application 100, 101, 102, 103 and 104 includes or is communicatively connected to a processor and memory (or respective processor and memory, as applicable), and is or includes a computer program stored in memory and/or electronic circuit controlled by the processor. In certain embodiments, each application is processed by a respective processing device or devices, such as one or more server computer, and the device or devices are communicatively connected to the manager application 131. In other embodiments, the application is in whole or part included in and run by the manager application 131 or in and by processor 132a and memory 132b, such as the server computer 132.

At least one user device (e.g., Device A 119, Device B 120, and Device C 121) can communicatively connect to the network 130 or link or links of the network 130. As will now be described, the user devices, for example purposes, Device A 119, Device B 120, and Device C 121, can communicatively connect to the manager application 131 and one or more of the applications, for example purposes, App1 100, App2 101, App3 102, App4 103, and/or App5 104.

Figure 1A:
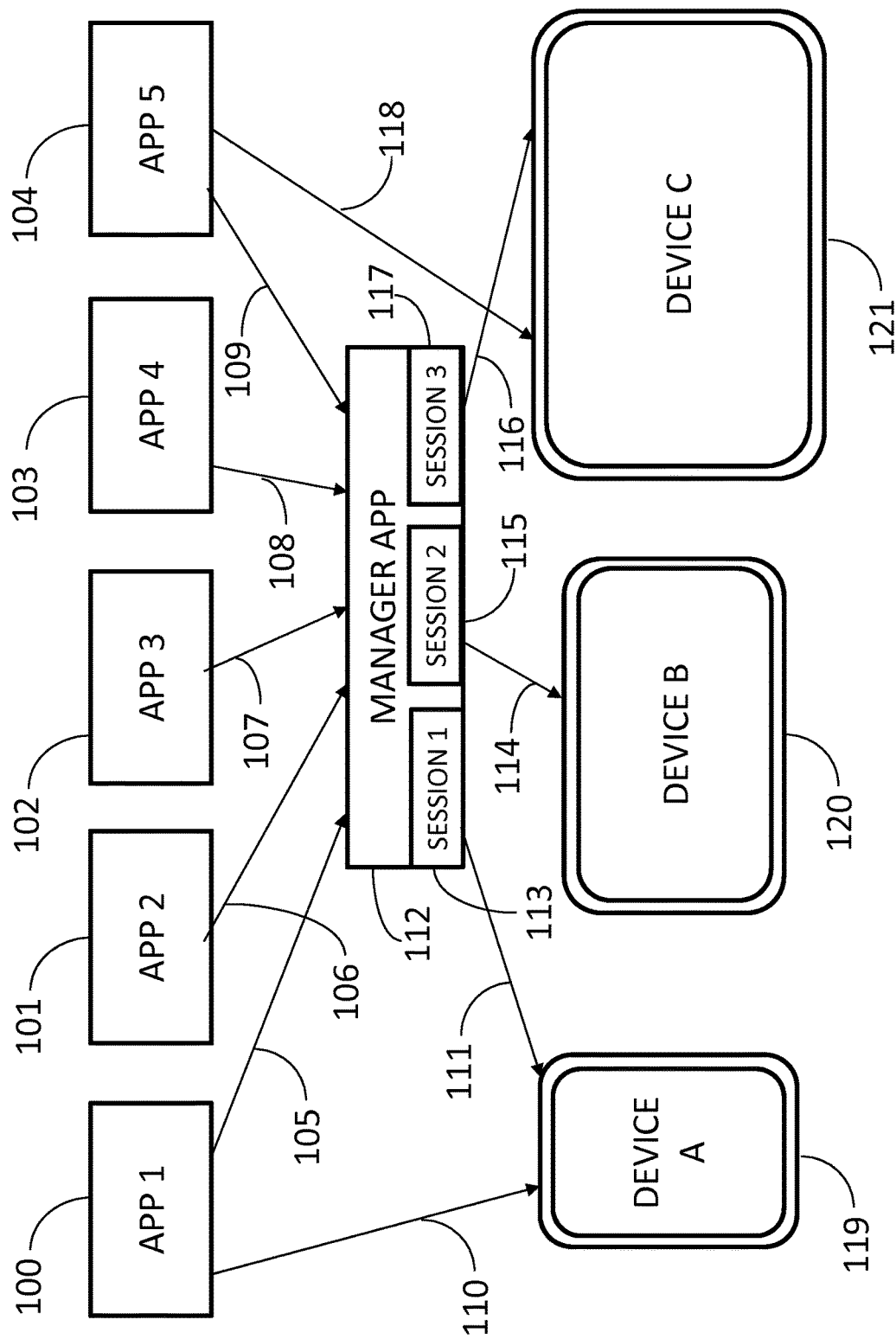
FIG. 1A illustrates an exemplary operation of the system of FIG. 1, according to certain embodiments of the invention.

Referring to FIG. 1A, in conjunction with FIG. 1, for a non-exclusive example of the system 10 in operation, five applications, App1 100, App2 101, App3 102, App4 103, and App5 104, are running, processed by a processing device such as the server 132 or other processing device(s). In the example, App1 100 is assigned 110 to Device A 119, and App5 104 is assigned 118 to Device C 121. All of the applications 100, 101, 102, 103, 104 are controlled 105, 106, 107, 108, 109 by a Manager Application 112 of the system 10, for example, the manager application 112 of FIG. 1 running on a server communicatively connected (or connectable) to the user devices 119, 120, 121. The Manager Application 112 has a session with all devices 119, 120, 121: Session 1 113 is assigned 111 to Device A 119, Session 2 115 is assigned 114 to Device B 120 and Session 3 117 is assigned 116 to Device C 121. In the respective session, the Manager Application 112 communicates over the network 130 with the respective user device for purpose of the particular application for the user device. For example, in Session 1 113, the Manager Application 112 and Device A 119 communicate over the network 130 in accordance with the App1 100, as will be further detailed.

Figure 2:
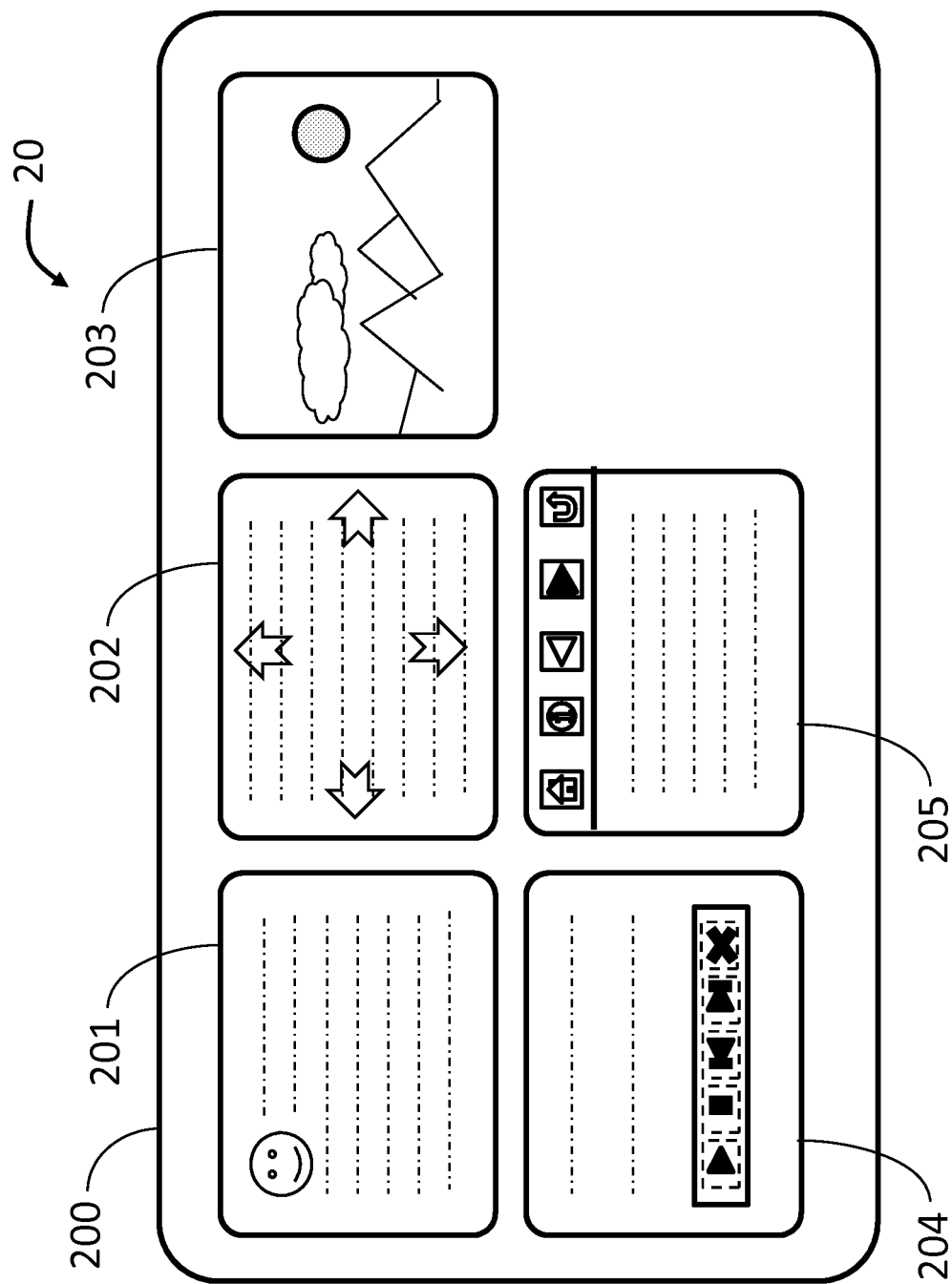
FIG. 2 illustrates an example user device screen image of a set of applications of application devices available to be switched for access by another device, according to certain embodiments of the invention.

Referring to FIG. 2, in conjunction with FIGS. 1 and 1A, an example display 20 of an exemplary one of the user device includes a screen image 200 output by the user device (for example, displayed in one of the user devices 119, 120, 121 of FIG. 1). The screen image 200 includes a set of applications (e.g., 201, 202, 203, 204, and 205) processed by the system 10 and controlled by the Manager Application 112, to allow movement from one user device to another (e.g., from device 119 to 121) with continuous processing state maintained for the running applications 201, 202, 203, 204 and 204. The screen image 200 is created in the user device (as applicable per the example) by the Manager Application 112, via communicative connection between that user device and the Manager Application 112. The Manager Application 112 is processed, for example, by the server computer 132, which server computer 132 is communicatively connected to the user device by the communications network 130.

To create the image 200 in the user device, the Manager Application 112 requests a respective application image 201, 202, 203, 204 and 205, from each of the Applications 100, 101, 102, 103, 104, respectively. The received application images 201, 202, 203, 204, 205 are tiled as a composite of the application images 201, 202, 203, 204, 205 at the Manager Application 112 (e.g., at the server 132 for the Manager Application 112) to create the overall screen image 200. The screen image 200 is presented 111, 114, 116 to the Devices 119, 120, 121 via communications over the network 130, when the devices 119, 120, 121 request over the network 130 the list of available Applications 100, 101, 102, 103, 104.

Figure 3:
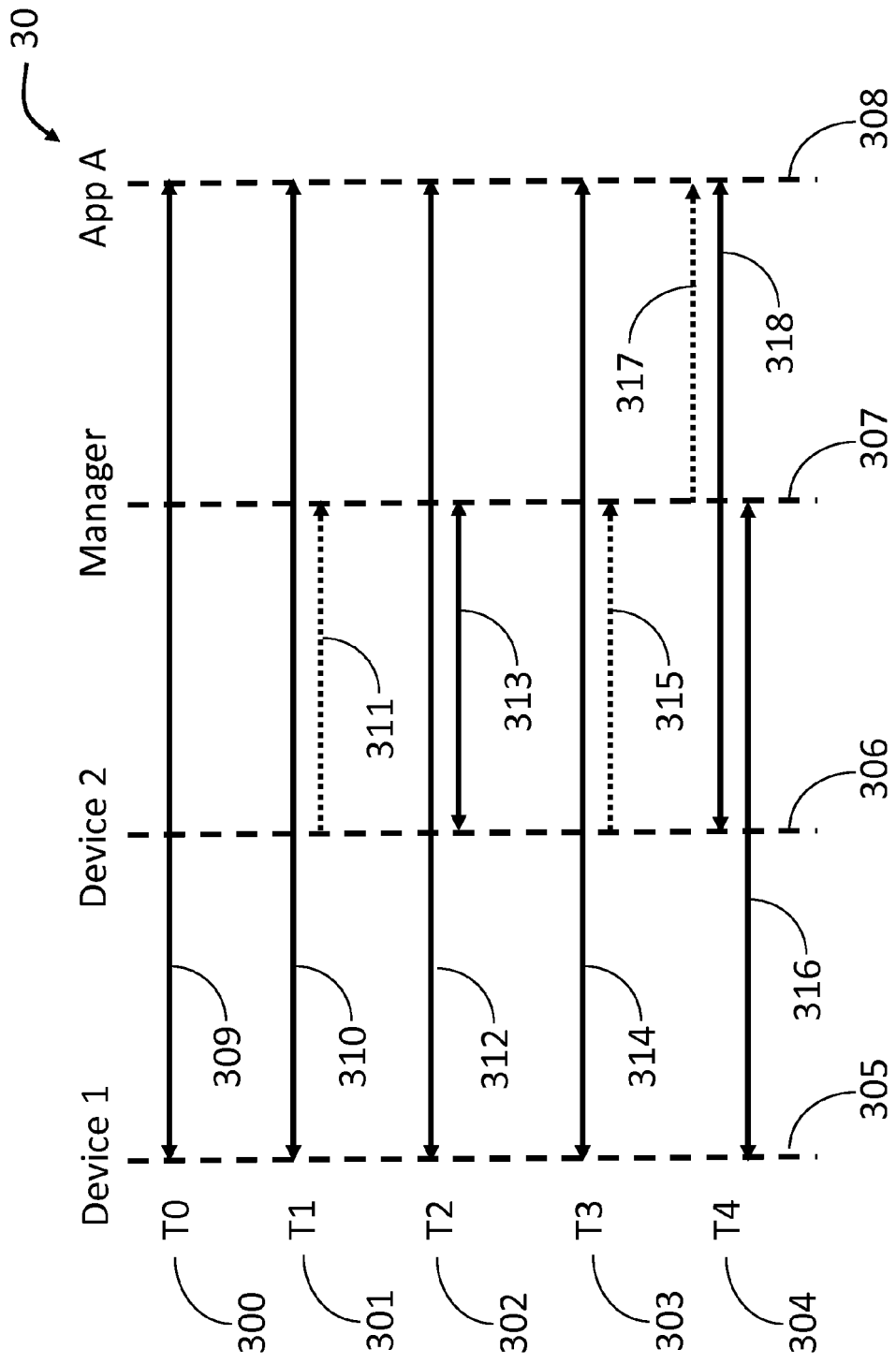
FIG. 3 illustrates example connections over time of pull switching of access to application devices from one user device to another user device, according to certain embodiments of the invention.

Referring to FIG. 3, in conjunction with FIG. 2, sessions 30 (e.g., Session 1 113 of Device A 119, Session 2 115 of Device B 120, and Session 3 117 of Device C 121) over time can be pulled from one user device to another user device (e.g., from Device A 119 to Device C 121) without loss of continuous operations of running Applications 100, 101, 102, 103, 104. As an example, at time T0 300, Device 1 305 (e.g., Device A 119 of FIG. 1) is communicatively connected by the network 130 to App A 308 (e.g., App1 100 of FIG. 1). At time T1 301, Device 2 306 (e.g., Device C 121) requests 311 over the network 130 to the Manager 307 (e.g., the Manager App 112) for the list of running applications (e.g., Applications 100, 101, 102, 103, 104). At time T2 302, Manager 307 responds 313 over the network 130 to Device 2 306 with the list of available applications. An example response with the list of running applications is the image 200 of FIG. 2.

At time T3 303, Device 2 306 responds 315 over the network 130 back to Manager 307 that it wants to use App A 308. For times T1 301, T2 302, T3 303, Device 1 305 remains accessing App A 308 by communications over the network 130 therewith. At time T4 304, the Manager 307 informs 317 by communication over the network 130 to App A 308 that App A 308 is to move access and use of the application (i.e., App A 308) to Device 2 306 from Device 1 305. App A 308 responds over the network 130 by moving use access 318 to Device 2 306. Also at time T4 304, the Manager 307 is communicatively connected 316 to Device 1 305, as Device 1 305 is no longer accessing App A 308. This type of movement (or transfer) of use of the application is called a pull operation, as the application use is pulled from one device to another device.

Figure 4:
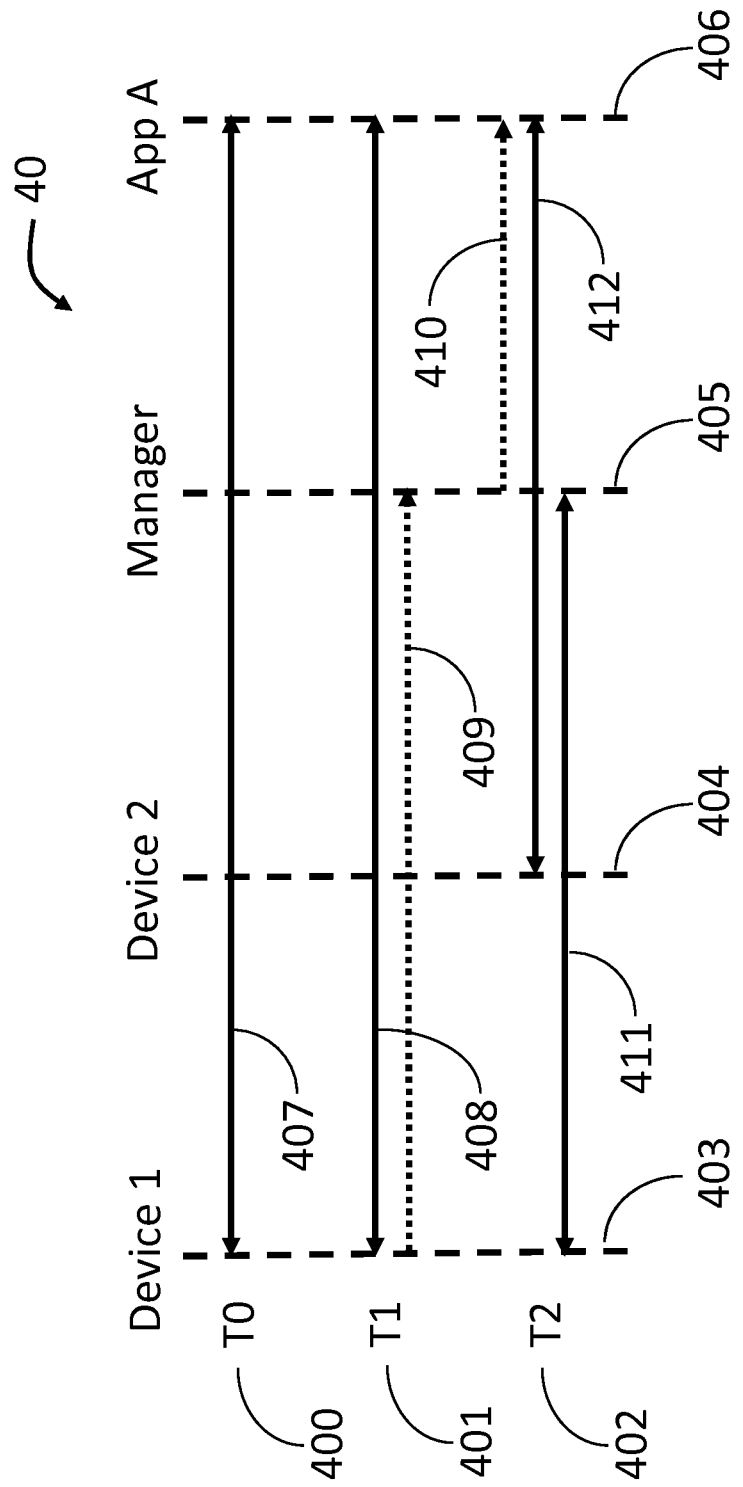
FIG. 4 illustrates example connections over time of push switching of access to application devices from one user device to another user device, according to certain embodiments of the invention.

Referring to FIG. 4, in conjunction with FIG. 2, sessions 40 (e.g., Session 1 113 of Device A 119, Session 2 115 of Device B 120, and Session 3 117 of Device C 121) over time can be pushed from one user device to another user device (e.g., from Device A 119 to Device C 121) without loss of continuous operations of running Applications 100, 101, 102, 103, 104. As an example, at time T0 400, Device 1 403 (e.g., Device A 119 of FIG. 1) is communicatively connected by the network 130 for access to App A 406 (e.g., App1 100 of FIG. 1). At time T1, Device 1 403 informs 409 over the network 130 the Manager 405 that use of App A 406 should be moved to Device 2 404 (e.g., Device C 121). At time T1, App A 406 is still communicatively connected 408 by the network 130 to Device 1 403. At time T2 402, the Manager 405 informs 410 via the network 130 the App A 406 that it is to move use access of the application to Device 2 404 from Device 1 403. App A 406 responds 412 by moving use access via the network 130 to Device 2 404. Also at time T2 402, the Manager 405 is communicatively connected 411 to Device 1 403, as Device 1 403 is no longer accessing App A 406. This type of movement (or transfer) of use of the application is called a push operation, as the application use is pushed from one device to another device.

Figure 5:
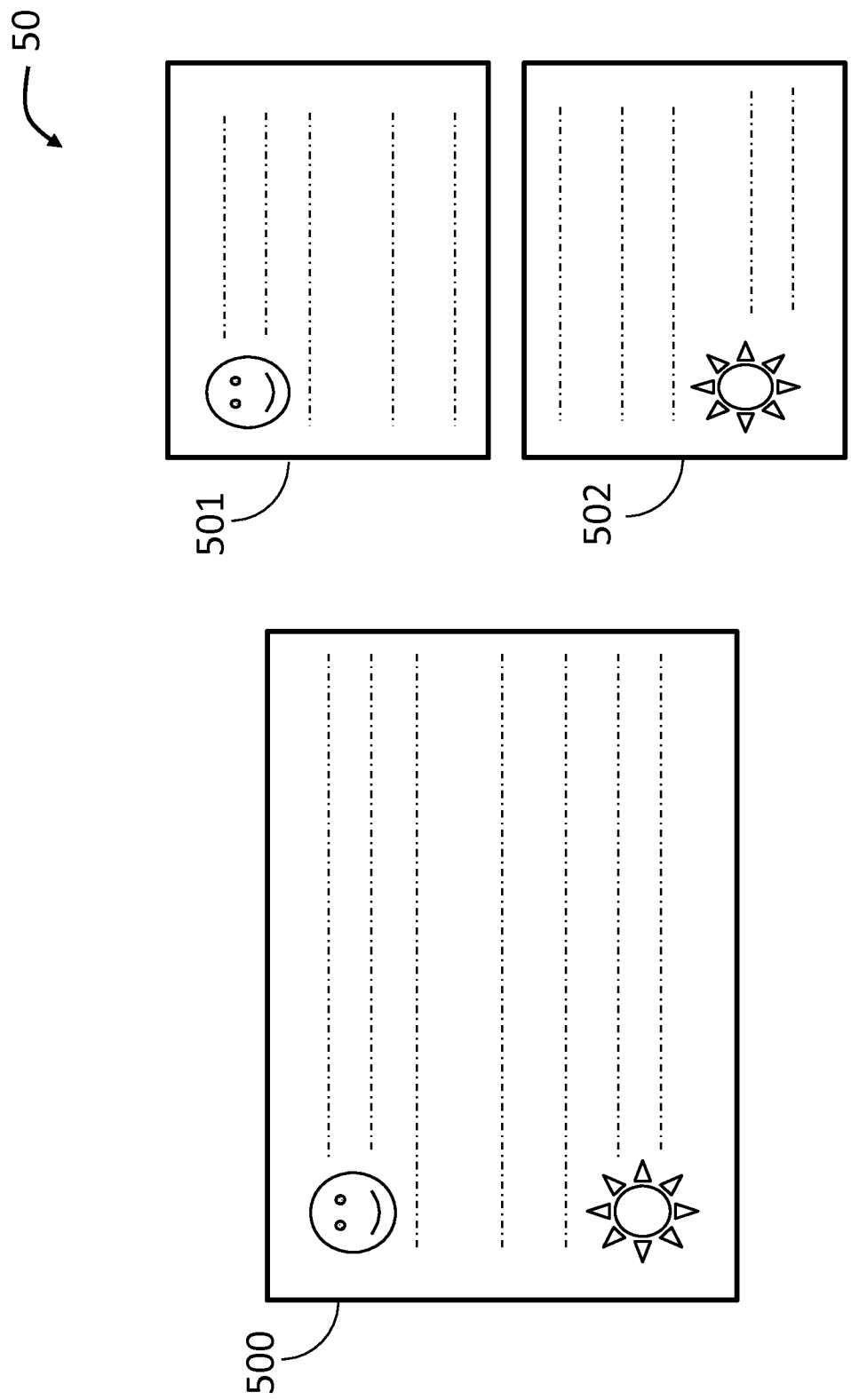
FIG. 5 illustrates example screen images in two different user devices, according to certain embodiments of the invention.

Referring to FIG. 5, respective screen images 50 of two different user devices depict an application for the devices. A user device with a large display presents the application as screen image 500, for example. In a user device with a smaller screen, for example a device to which the use of the application of the screen image 500 is moved, the application segregates the same information of the application in screen image 500 into multiple screens 501, 502. This accommodates the same information in more than one screen image 501, 502, so that each individual screen image 501 or 502 will, at different time, separately fit the smaller display. Similarly, when reversed, such that use of the application is first accessed from a device with smaller display and then use transferred to a device with large display, the information segregated as multiple images 501, 502 for the smaller display is displayed in the device with large display as a single composite image 500 in the large display. In both cases, the continuously processed application maintains run-time state for displaying information. That information, however, is displayed in different manners depending on the user device then-accessing use of the application and, thus, the information.

Figure 6:
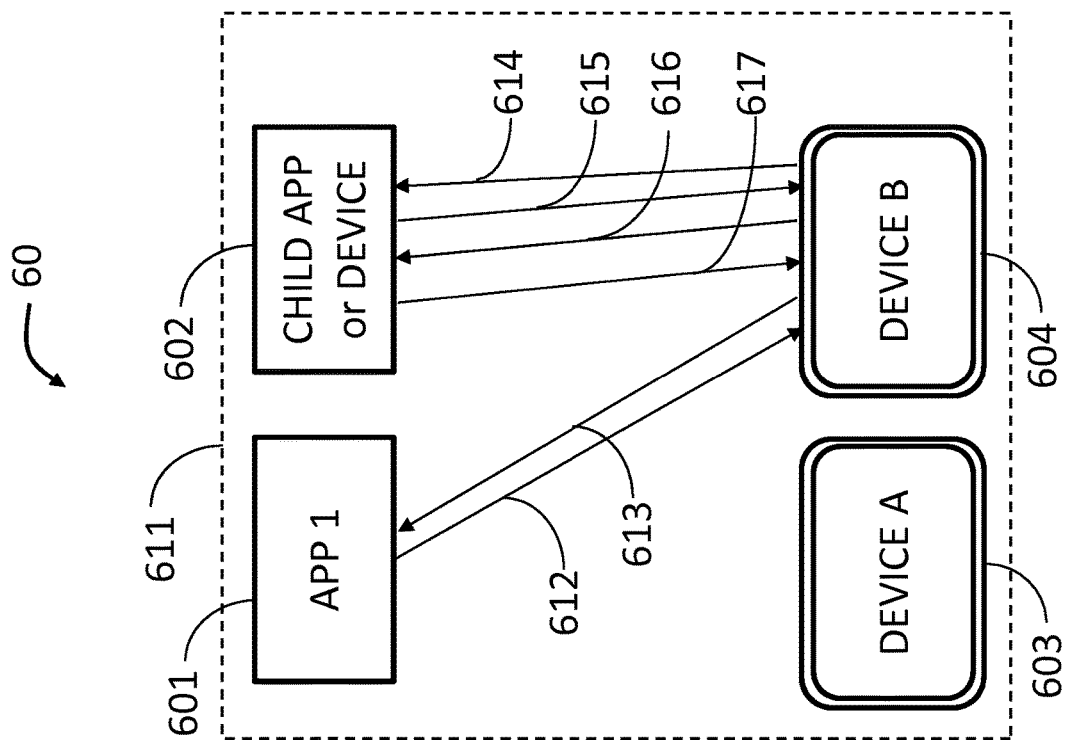
FIG. 6 illustrates connections for switching of access to a complex application device from one user device to another user device, according to certain embodiments of the invention.
Figure 6:
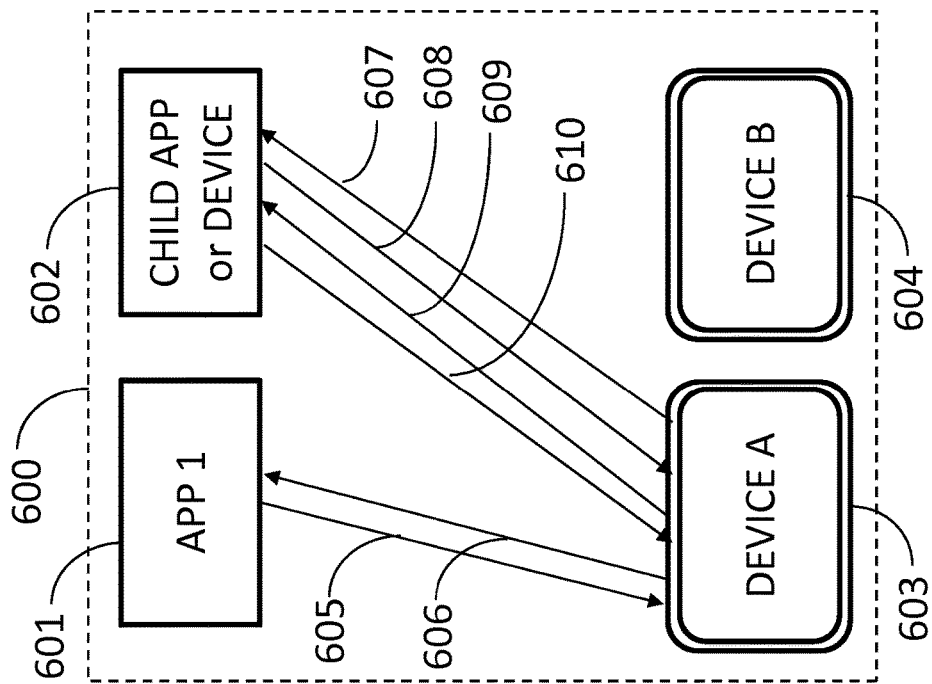

Referring to FIG. 6, an example of a system and process 60 according to the foregoing, moves (or transitions/transfers) use via access over a network of a complex application 601, 602, from one user device 603 to another user device 604. In the left side 600 of FIG. 6, App 1 601 is being accessed by Device A 603. App 1 601 is communicating 605 information to Device A 603 and receiving 606 information communicated from Device A 603. App 1 601, in operation during access by Device A 603, relates to another application or device, such as a Child Application or another Device 602 by incorporation, inclusion, link or other interoperation or communication with the Child Application or Device 602. In the example of FIG. 6, the Child App or Device 602 communicates two information types 608, 610 to Device A 603 and receives two information types 607, 609 from Device A 603. Device B 604 is not accessing App 1 601 in this left side 600 illustration of FIG. 6.

Now referring to the right side 611 of FIG. 6, use via access over the network of App 1 601 has been moved (or transferred/transitioned) from Device A 603 to Device B 604. To move the use of App 1 601, App 1 601 moves its information flows from Device A 603 to Device B 604. App 1 601 then continues by sending 612 and receiving 613 information from Device B 604, but not Device A 603. Also as illustrated in the right side 611, information flows in respect of Child App or Device 602 are now communicated to and from Device B 604, rather than Device A 603. These information flows are sent 615, 617 to Device B 604 and received 614, 616 from Device B. Device A 603 is not accessing App 1 601 or Child App or Device 602, and communications halt between Device A 603, on the one hand, and App 1 601 and/or Child App or Device 602, on the other hand; and communications of App 1 601 and/or Child App or Device 602 are instead with Device B 604.

Figure 7:
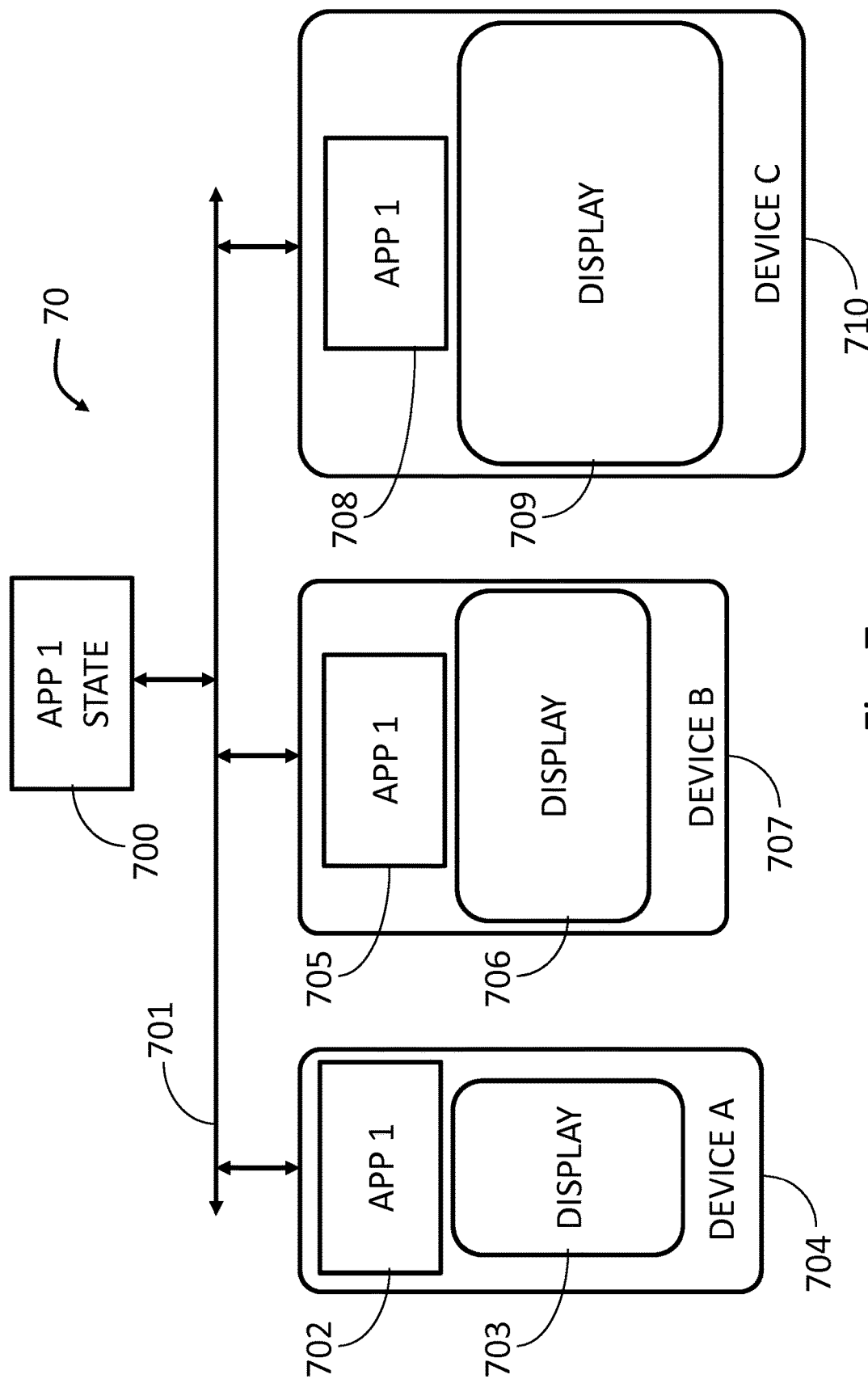
FIG. 7 illustrates example instantiation application devices in operation with a table in a distributed application system, according to certain embodiments of the invention.

Referring to FIG. 7, an example distributed application implementation of the foregoing systems and processes 70 includes three devices Device A 704, Device B 707 and Device C 710, of which only one can be running application App 1 at any instance. Device A 704 includes an instantiation App 1 702, Device B 707 includes an instantiation App 1 705, and Device C 710 includes an instantiation App 1 708. All of the Devices A 704, B 707, and C 710 can communicate 701 with each other, or to a common App 1 State 700 communicatively accessible to the Devices 704, 707, 710, for example, over a communications network 701.

In an exemplary operation, Device A 704 uses a running application (such as by accessing over the communications network 701 the application, maintained on a server in connection with operation of a Manager Application), for example, the App 1 702 instance is processed. The state of the App 1 702 is maintained in a table or other storage of or communicatively connected to the Manager Application as an App 1 State 700. If the user moves to Device B 707 (from Device A 704, for example) to process the App 1 705 and use the particular application, the App 1 705 requests over the communications network 701 from the then-maintained App 1 State 700 a processing status (i.e., state) of the App 1 702. The App 1 702 running on Device A 704 responds with the then-present state of the application (i.e., the App 1 702 processing state) for detection by the App 1 State 700. The App 1 705 on Device B 706 then communicatively receives from the App 1 State 700 the then-present processing state of the application in respect of the App 1 702, and the running application presented with the particular state is presented to Device B 706. Device B 706, and its user, therefore, experience the exact same running application as was in use by Device A 704.

In an alternative exemplary operation, Device A 704 uses the running application (as described) and the instantiation App 1 702 continuously sends the application state to App 1 State 700 over the network 701. At each point, therefore, the application state is available from the App 1 State 700. If a move is made to Device B 707 for use of the application, the App 1 705 instance of Device B 707 initially requests the then-registered state of the running application from App 1 State 700. The App 1 State 700 responds with that state, and the App 1 705 on Device B 706 receives the state to present to Device B 706 for the running application. The Device B 706, and its user, therefore, experience the exact same running application as was in use by Device A 704. The App 1 705 processed by Device B 706 then continuously updates running application state in the App 1 State 700. In such distributed implementation, the saving and restoring of the complete state of the application in these manners allows movement between devices for use of the application, with continued operation of the application among each successive device.

Figure 8:
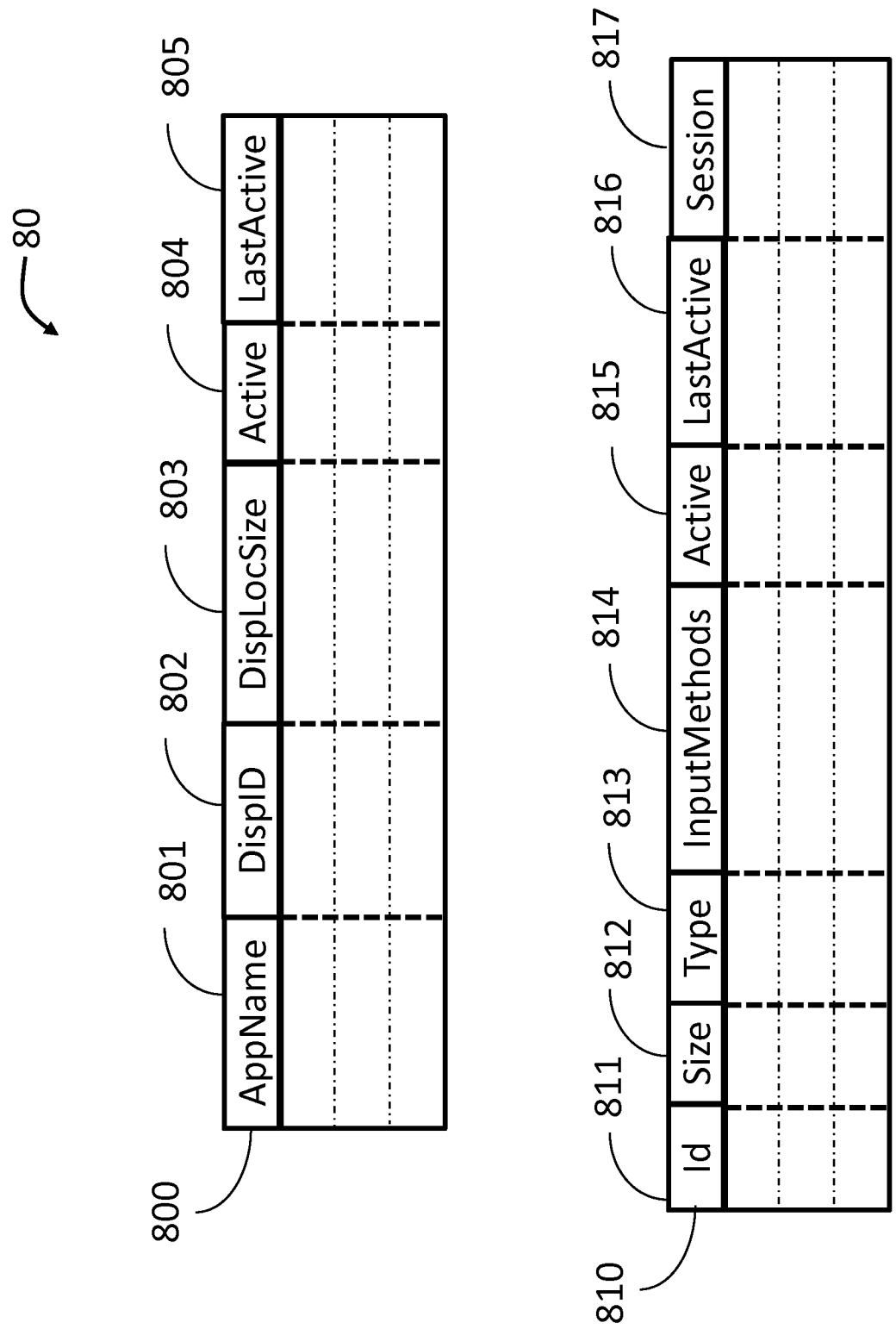
FIG. 8 illustrates an example app list and display list of a manager device, according to certain embodiments of the invention.

Referring to FIG. 8, a Manager (for example, the manager application 131 of FIG. 1 and/or Manager Application 112 of FIG. 1A) creates and maintains, and employs in operation, two list tables, an App List 800 and a Display List 810. In performing the operations described with respect to FIG. 3, the Manager (e.g., Manager 307 in FIG. 3) uses and updates the lists of these tables. Similarly in performing the operations described with respect to FIG. 4, the Manager (e.g., Manager 405 in FIG. 4) uses and updates the lists of these tables. For each device accessing running application(s) related to the Manager, the Manager manipulates the App List 800 and the Display List 801. The Manager maintains in the App List 800 identification of each accessing device and respective one or more application(s) which may be accessed and used by the device (i.e., the application tiles for running applications for the device and that are shown on the device display), with one entry for each application. The Manager maintains in the Display List 801 data representing the respective display for each such device, with one entry for each of a user's displays.

For example, App List 800 entries are:
  AppName 801: The name of the application
  DispId 802: A number that references the display from the Display List 810.
  DispLocSize 803: The location and size of the application on the display.
  Active 804: True if the application is currently being displayed on a display.
  LastActive 805: The time the application was last used.
For example, Display List 810 entries are:
  Id 811: The number assigned to a display, used in App List 800.
  Size 812: The height and width of the display.
  Type 813: The type of the display, such as: handheld, tablet, desktop or big screen.
  InputMethods 814: The input methods that the display uses, such as keyboard, mouse, or touchscreen.
  Active 815: True if there is an active session to the display.
  LastActive 816: The time the display was last active.
  Session 817: Information about the display session such as: IP address, port, and communications type.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A system, the system communicatively connected to a telecommunications network, a first user device and a second user device communicatively connected to the network, comprising:
   a processor of a server computer;
   a manager device communicatively connected to the network for communicating with the first user device and the second user device;
   at least one application program being processed by the processor, the at least one application program being processed by the processor communicatively connected to the manager device and communicatively connected by the network to the first user device, each respective one of the at least one application program being processed by the processor includes a respective processing state for the first user device;
   a state table of the respective processing state for each respective one of the at least one application program being processed by the processor communicatively connected to the first user device, the state table is communicatively connected to the manager device, the manager device updates the respective processing state of the state table for each respective one of the at least one application program for the first user device during processing of the at least one application program by the processor;
   wherein communicative access over the network to the at least one application program processed by the processor is switchable by the manager device from the first user device to the second user device, providing continuing operations of each respective one of the at least one application program being processed by the processor for the second user device based on the respective processing state maintained in the state table for the first user device, commencing with the respective processing state of each respective one of the at least one application program for the first user device.

2. The system of claim 1, wherein the second user device, on accessing any respective one of the at least one application program and obtaining the respective processing state of the respective one of the at least one application program, displays an output image of the respective one of the at least one application program corresponding to the respective processing state for the respective one of the at least one application program for the first user device.

3. The system of claim 1, wherein each of the at least one application program is selected from the group consisting of: computer program stored in non-transitory memory and processed by a processor, electrical circuit controlled by a processor, and combinations.

4. The system of claim 1, wherein communicative access over the network to the manager device is switched from the first user device to the second user device, providing continuing operations of the at least one application program for the second user device, commencing with the respective processing state of the at least one application program for the first user device.

5. The system of claim 4, wherein the first user device operating the at least one application program via communications over the network communicates to the manager device that the at least one application program is to commence communications with the second user device, the manager device updates the respective processing state for the at least one application program and the first user device, and the second user device then commences communicating with the at least one application program and the first user device halts communicating with the at least one application program.

6. The system of claim 4, wherein, during communicative operations of the at least one application program and the first user device, the second user device communicates over the network to the manager device that the at least one application program is to switch communications with the second user device, the manager device updates the respective processing state for the at least one application program and the first user device, and the second user device then commences communicating with the at least one application program and the first user device halts communicating with the at least one application program.

7. The system of claim 4, further comprising:
   a first screen image format communicated by the at least one application program to the first user device during communicative operations of the first user device with the at least one application program over the network; and
   a second screen image format communicated by the at least one application program to the second user device during communicative operations of the second user device with the at least one application program over the network.

8. A system, the system communicatively connected to a packet switched network, a first communications device and a second communications device each communicatively connected to the network, comprising:
   a processor of a server computer;
   a manager communicatively connected to the network for communicating with the first communications device and the second communications device; and
   an application device being processed by the processor and communicatively connected to the manager and communicatively connected to the network for communicating with the first communications device, the application device includes a processing state of processing operations of the application device during communicative operations of the application device with the first communications device;
   wherein communicative access over the network to the application device being processed by the processor is switchable by the manager from the first communications device to the second communications device, providing continuing operations of the application device being processed by the processor for the second communications device, commencing with the processing state of operations of the application device with the first communications device.

9. The system of claim 8, further comprising:
   a table of the processing state, the table is communicatively connected to the manager, the manager updates the processing state of the table during operations of the application device via communications over the network with the first communications device and the second communications device;

a first instantiation application object corresponding to the processing state of the application device for the first communications device, during communicative operations of the application device with the first communications device, communicated by the first communications device to the table as the processing state; and a second instantiation application object corresponding to the processing state of the application device for the second communications device, during communicative operations of the application device with the second communications device, communicated by the second communications device to the table as the processing state.

10. The system of claim 8, wherein the first communications device accessing the application device pushes via the manager access to the application device to the second communications device.

11. The system of claim 8, wherein the second communications device pulls via the manager access to the application device from the first communications device.

12. The system of claim 8, wherein the manager maintains a respective device identifier and respective image formatting criteria for each of the first communications device and the second communications device, respectively.

13. A method of remotely providing access to a processed application program to a first user device and a second user device, comprising:

processing by a processor the processed application program for the first user device;

delivering the processed application program from processing over a telecommunications network to the first user device communicatively connected to the network;

collecting a process state of the processing of the processed application program;

storing the process state of the processing of the processed application program;

switching the processed application program over the telecommunications network to the second user device communicatively connected to the network;

retrieving the process state upon the step of switching; and continuing processing by the processor of the processed application program for the process state for the second user device upon switching.

14. The method of claim 13, further comprising:

managing the steps of collecting, storing, and switching by a manager device communicatively connected to the processed application program and the network.

15. The method of claim 14, further comprising:

receiving a request by the manager device from the first user device, to perform the step of switching.

16. The method of claim 14, further comprising:

receiving a request by the manager device from the second user device, to perform the step of switching.

17. The method of claim 13, wherein the collecting is performed by an instantiation application device of the first user device; and further comprising:

receiving the process state by a manager device from the instantiation application device of the first user device.

18. The method of claim 13, wherein the collecting is performed by a first instantiation application device of the first user device; and further comprising:

receiving the process state by a second instantiation application device of the second user device from the first instantiation application device of the first user device.

19. The method of claim 13, further comprising:

formatting delivery of the processed application program to the second user device based on a criteria stored for the second user device in a storage.

* * * * *